United States Patent [19]

Weavers

[11] Patent Number: 5,568,863
[45] Date of Patent: Oct. 29, 1996

[54] CASSETTE ALBUM BOX WITH SPINE WINDOW

[75] Inventor: Mark W. Weavers, Little Canada, Minn.

[73] Assignee: Minnesota Mining and Manufacturing Company, St. Paul, Minn.

[21] Appl. No.: 509,126

[22] Filed: Jul. 31, 1995

[51] Int. Cl.⁶ .......................... B65D 85/67; B65D 85/575
[52] U.S. Cl. ...................... 206/387.1; 206/311; 206/472; 206/806; 220/751; 229/117.22
[58] Field of Search ........................... 206/387.1, 387.13, 206/307, 311, 472–475, 806, 45.31, 45.34; 220/751; 229/117.22

[56] References Cited

U.S. PATENT DOCUMENTS

| | | | |
|---|---|---|---|
| 4,501,359 | 2/1985 | Yoshizawa | 206/387 |
| 4,520,927 | 6/1985 | Sato | 206/387.1 |
| 4,555,021 | 11/1985 | Fujii et al. | 206/387 |
| 4,717,021 | 1/1988 | Ditzig | 206/387 |
| 4,911,298 | 3/1990 | Miyagawa et al. | 206/387.1 |
| 4,917,244 | 4/1990 | Sayers | 206/387 |
| 5,143,217 | 9/1992 | Igarashi | 206/387 |
| 5,277,308 | 1/1994 | Finke et al. | 206/45.31 |

FOREIGN PATENT DOCUMENTS 05-042562  2/1993  Japan .

Primary Examiner—Paul T. Sewell
Assistant Examiner—Luan K. Bui
Attorney, Agent, or Firm—Gary L. Griswold; Walter N. Kirn; Charles D. Levine

[57] ABSTRACT

A box for storing cassettes includes a base, a cover, and a plurality of side walls. One of the side walls is a spine side wall which has a window formed as an opening that permits viewing a label on the cassette. A transparent external pocket wraps around at least part of the spine side wall and at least part of either the base, the cover, or both. The transparent external pocket is the only physical barrier to prevent access to the inside of the box at the window. The external pocket permits viewing a label on the cassette and can receive a sheet of information that is readable through the transparent external pocket.

18 Claims, 5 Drawing Sheets

CASSETTE ALBUM BOX WITH SPINE WINDOW

TECHNICAL FIELD

The present invention relates to storage boxes for cassettes. More particularly, the present invention relates to storage boxes having windows.

BACKGROUND OF THE INVENTION

A common method to use and store magnetic recording tape is the cassette. Typically, the cassette has an enclosure with two tape reels. During use the tape is transported from one reel to the other past one or more recording or playback transducers. Cassettes are useful for storing tape in an easily retrievable manner, since they can be easily labeled on one or more surfaces and many cassette formats can be arranged with at least part of the labels visible on a spine similar to arranging books on a shelf.

However, it is often desirable to provide a protective enclosure, such as a box or case, to store or transport the cassette. Such boxes are called album or library boxes. Because the album box encloses the cassette, it becomes necessary to provide some device, such as labeling an outer surface of the album box, to describe the contents of the stored cassette. Since an album box may contain different cassettes at various times, it is desirable for the label on the box to be easily changed to correspond to the stored cassette.

One way to change labels on an album box is taught in U.S. Pat. No. 4,717,021. Transparent film panels are attached to the outer surfaces of the box to form transparent pockets for receiving labels. Another known box uses a single pocket wrapped around the box spine and front cover. With these boxes, errors in matching cassettes to boxes can occur if the correct cassette is not placed in the box carrying its label. Moreover, this labeling system requires labels to be created both for the cassette and for the box.

U.S. Pat. No. 4,555,021 discloses a simpler way to provide a labeled container for a cassette. An album box is made of a transparent material, so that the cassette label can be viewed through the box wall. To allow only the label to be visible, the nonwindow portions of the box are textured to reduce the transparency of the surface. However, this box requires significant effort to assemble, and is not as aesthetically pleasing because it is made of a flat blank which must be folded into the shape of an album box.

A cassette box having a separately formed window inserted into an aperture in an opaque wall of the box is disclosed in U.S. Pat. No. 4,501,359. These boxes are difficult to produce at the low cost levels required for packaging, due to the separate assembly operation for the window.

U.S. Pat. No. 5,277,308 discloses a cassette container made entirely of transparent polymeric material, except for the door which is made of a living hinge material. This container suffers from using large quantities of transparent molding materials. Durable transparent polymers tend to be more expensive than commonly available non-transparent materials.

Japanese Published Patent Application No. 05-042562 discloses an injection molded container for a cassette which uses transparent material for the window portions and an opaque material for the remainder of the container. This container is produced by a two-shot molding process. A sliding core is inserted into the mold cavity to form the window aperture while molding the opaque portion of the container. After the opaque portion has been formed, the sliding core is removed from the window aperture area and transparent molding material is injected to form the window. This two-shot molding is more difficult and expensive than one-shot molding, and the ability to perform two-shot molding is not widely used in the packaging industry.

In view of the disadvantages of the existing album boxes and available methods of fabrication, there is a need for a more easily produced opaque cassette container having at least one transparent window.

SUMMARY OF THE INVENTION

The box for storing cassettes of this invention includes a base, a cover, and side walls connected to at least one of the base and the cover. One side wall is a spine side wall which corresponds to either the spine or the door of the cassette when the cassette is stored in the box. The spine side wall has a window formed as an opening in the wall that permits viewing a label on either the spine or the door of the cassette.

A transparent external pocket wraps around at least part of the spine side wall and at least part of either the base, the cover, or both. The external pocket completely covers the window in the spine side wall and is the only physical barrier to prevent debris from entering the box through the window. The external pocket permits viewing a label on the cassette. A sheet of information can be placed in and read through the transparent external pocket.

The box can include a system for hanging the box on a bar. The system can include a hook which can be located on the opposite side of the box from the spine side wall. The hook can be molded as one piece with the box. Alternatively, the hook can slide from an extended position in which it can engage the bar to a retracted position in which it is received within the box. Alternatively, the hook can pivot from a position in which it can engage the bar to a position in which it is secured to the side wall of the box.

The box and the pocket can be made of opaque plastic, such as polypropylene or polyethylene, and the box can be injection or blow molded.

DETAILED DESCRIPTION

The album box of this invention is opaque with a window for viewing the label of an enclosed cassette. The window, while allowing viewing of the label, does not allow debris to enter the box. Importantly, this is accomplished at the same or even less cost than existing cassette boxes.

Cassettes that are stored in the box include video cassettes which come in various formats such as VHS, Betacam, D1, D2, D3, D5, 8 mm, and U-matic, and in various sizes. Audio cassettes also can be stored. The cassettes typically have a door along one side wall and a spine opposite the door. The spine, the door, or both, depending on the format, can receive a label to identify the contents recorded on the cassette.

Figure 1:
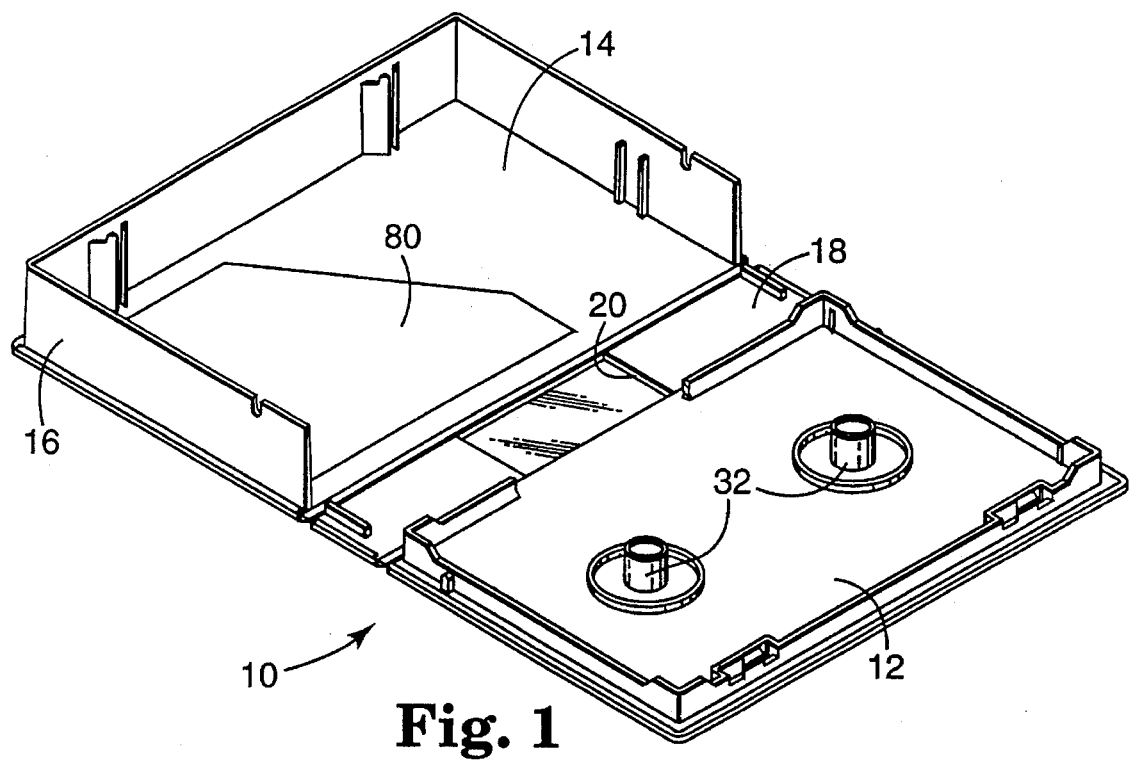
FIG. 1 is a perspective view of an open cassette box of the invention with a window the full width of the spine.
Figure 9:
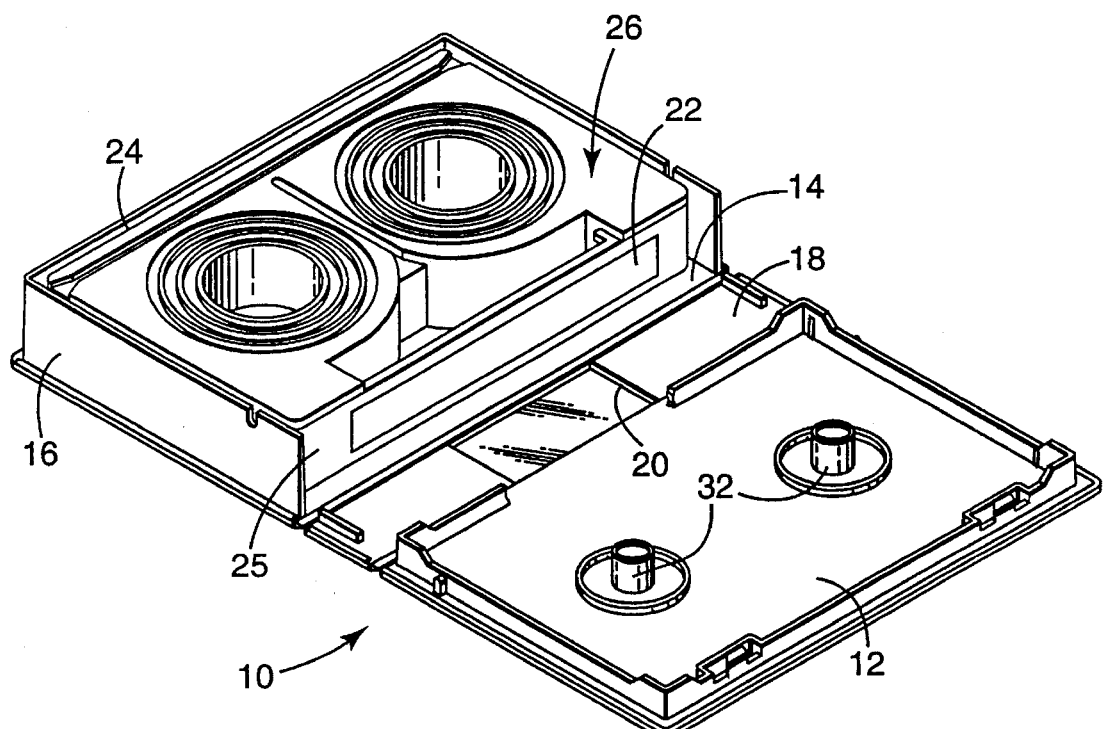
FIG. 9 is a perspective view of the cassette box of FIG. 1 showing a cassette in the box.

The box 10, as shown in FIG. 1, includes a base 12, a cover 14, and a plurality of side walls 16 connected to at least one of the base 12 and the cover 14. One of the side walls is a spine side wall 18 which corresponds to the spine of the cassette when the cassette is stored in the box. The spine side wall 18 has a window 20 formed as an opening in the wall 18 that permits touching and contacting the contents of a box 10 even when the box is closed, and permits viewing a label 22 on the spine 24 of the cassette 26. (The opening, by itself, can permit debris access to the inside of the box 10.) The label can also be located on the door 25 of the cassette 26 as shown in FIG. 9. The window 20 can extend for the entire width of the spine side wall 18 (to the living hinges that connect the spine side wall 18 to the base 12 and cover 14) as shown in FIG. 1, or the window 20' can extend for less than the entire width, leaving portions of the spine side wall 18 extending for the entire length of the spine side wall on one or both sides of the window 20', as shown in FIG. 2.

A transparent external pocket 28 wraps around at least part of the spine side wall 18 and at least part of either the base 12, the cover 14, or both. The external pocket 28 completely covers the window 20 in the spine side wall 18 and is the only physical barrier to prevent access to the inside of the box 10 at the window 20. The external pocket 28 permits viewing a label 22 on the spine 24 or the door 25 of the cassette 26. The transparent external pocket 28 can receive a sheet 30 of information that can be read through the pocket 28.

The box 10 can include a mechanism, such as projections 32, to align the spine 24 of the cassette 26 with the spine side wall 18 of the box 10. As shown in FIG. 1, the projections 32 engage portions of the cassette reels to prevent the box 10 from being closed completely when the cassette spine 24 does not align with the spine side wall 18. This system is used with cassettes which must have cassette reel retention provided by the box. Because the reel is not centered on the front to back dimension of the cassette, when the cassette is put into the box the spine with the label can be 10–12 mm away from the spine side wall 18. The transparent external pocket permits viewing and reading the label on the cassette even when the label is so spaced from the window. (In contrast, a "clear" polypropylene box has a milky color preventing a label on the cassette from being easily readable.)

Figure 2:
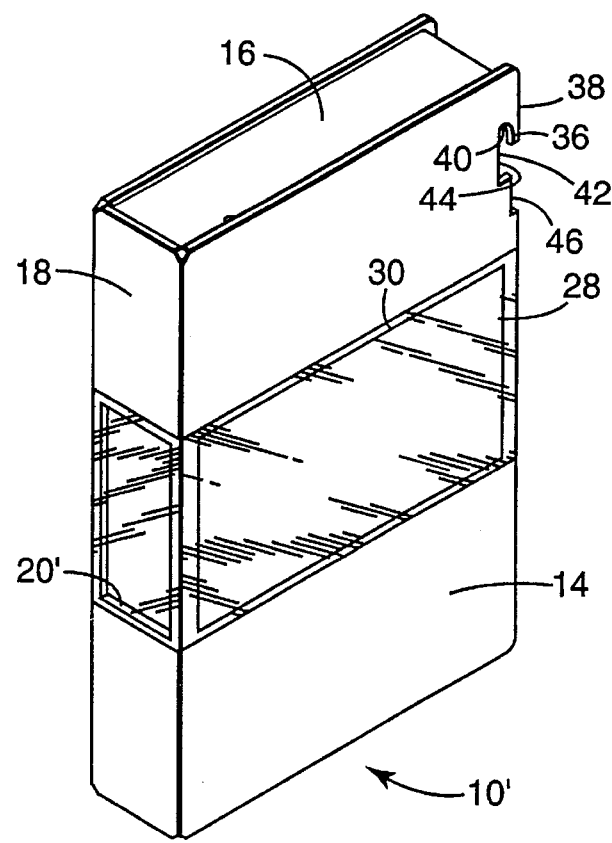
FIG. 2 is a perspective view of the cassette box with a partial width spine window with the box closed.
Figure 3:
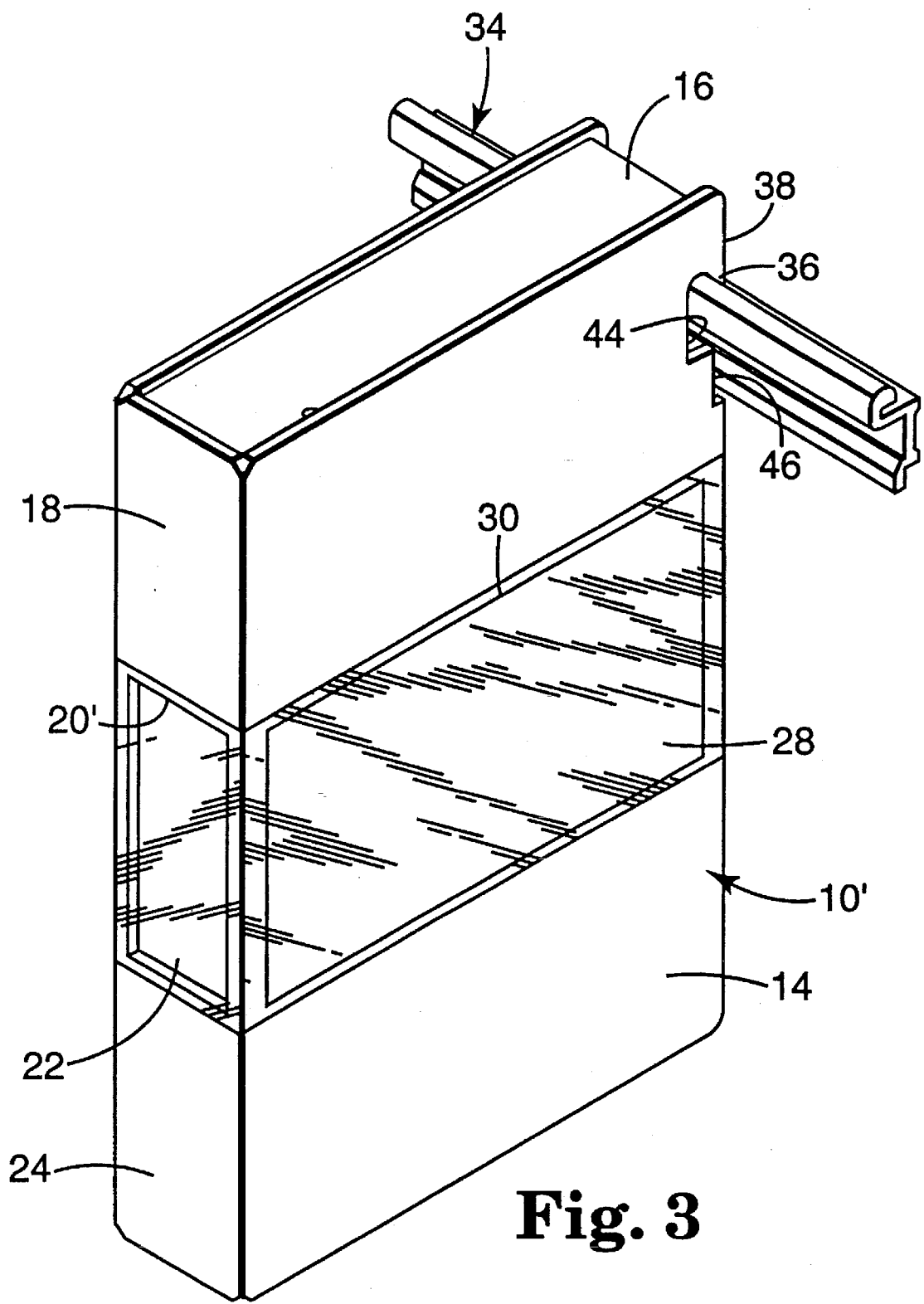
FIG. 3 is a perspective view of the cassette box of FIG. 1 showing the hanging system and a hanger bar.
Figure 4:
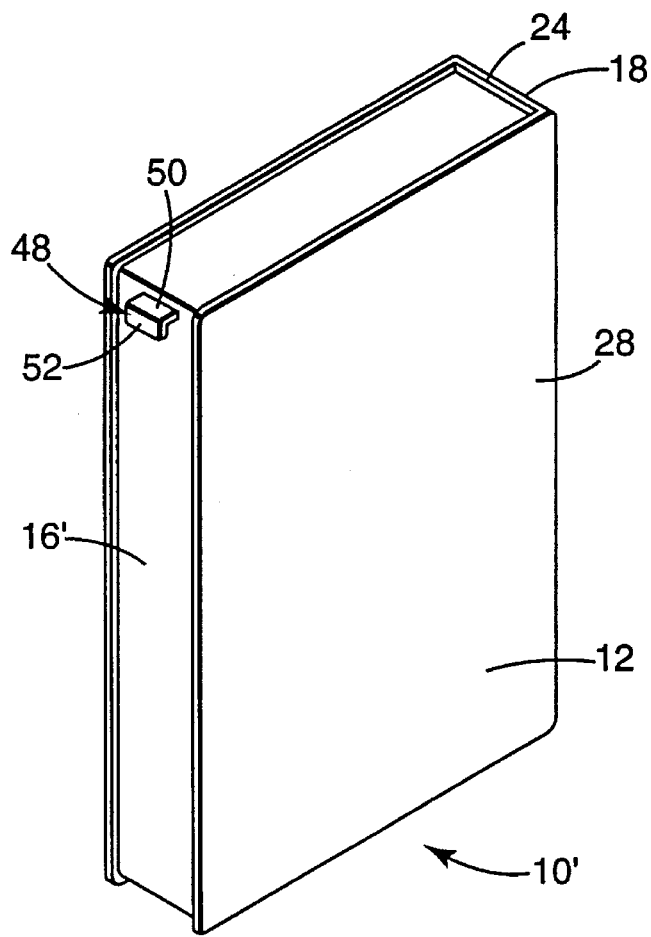
FIG. 4 is a perspective view of another embodiment of the cassette box having a retractable hanging system hook.
Figure 5:
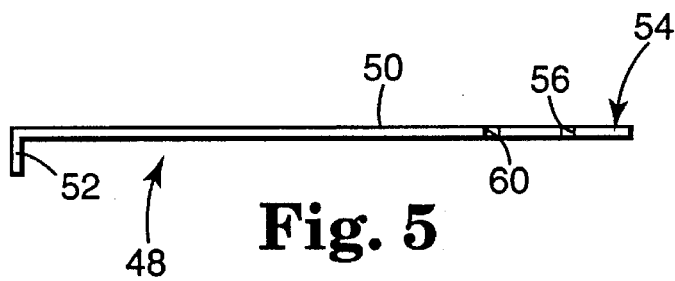
FIG. 5 is a side view of the hook of FIG. 4.
Figure 6:
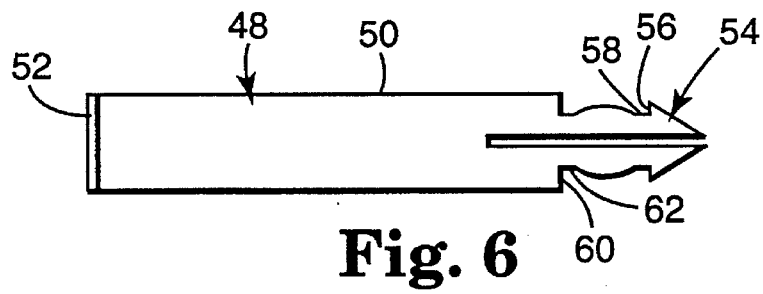
FIG. 6 is a top view of the hook of FIG. 4.

As shown in FIGS. 2 and 3, the box 10 can be hung from a bar, such as a hanger bar 34, using a hanging system. The hanger bar 34 can be mounted on a wall or stand to receive cassette boxes 10 for storage and easy access. The hanging system includes a hook 36 which can be located on the opposite side of the box 10 from the spine side wall 18. The hook 36 permits the box 10 to be hung while the cassette 26 contents can be read from the label 22 on the cassette 26, which is visible through the window 20. The hook 36 can be molded integrally as one piece with the box 10.

The hook 36 has an outer surface 38 generally planar with the surface of the side walls 16 of the box 10. An undercut portion 40 is formed between an inner surface 42 of the hook 36 and a recessed portion 44 of the side wall 16. The recessed portion 44 can have an extended portion 46 which extends beyond the length of the hook 36 to enable the box 10 to be placed on and removed from the hanger bar 34. In another embodiment, the box 10 can include two hooks 36, one on the spine side wall 18 and one on the opposing wall 16, to permit hanging the box 10 with either wall facing outwardly.

In another embodiment, shown in FIGS. 4–7, the hook 48 can slide from an extended position in which it can engage the hanger bar 34 to a retracted position in which it is received within the box 10'. This hook 48 can have a longer body portion 50 which slides within the box 10', and a shorter hook portion 52, which can be orthogonal to the body portion 50. In the retracted position, the hook 48 can be flush with or recessed from the side wall 16' of the box 10' so it does not affect the outer dimensions of the box.

This hook 48 includes an angled interior end 54 on the body portion 50 which has at least one first engaging wall 56 and at least one first detent 58. At least one second engaging wall 60 and at least one second detent 62 are located closer to the hook portion 52 than are the first engaging wall 56 and detent 58. As shown, two first engaging walls 56, two first detents 58, two second engaging walls 60, and two second detents 62 are used.

Figure 7:
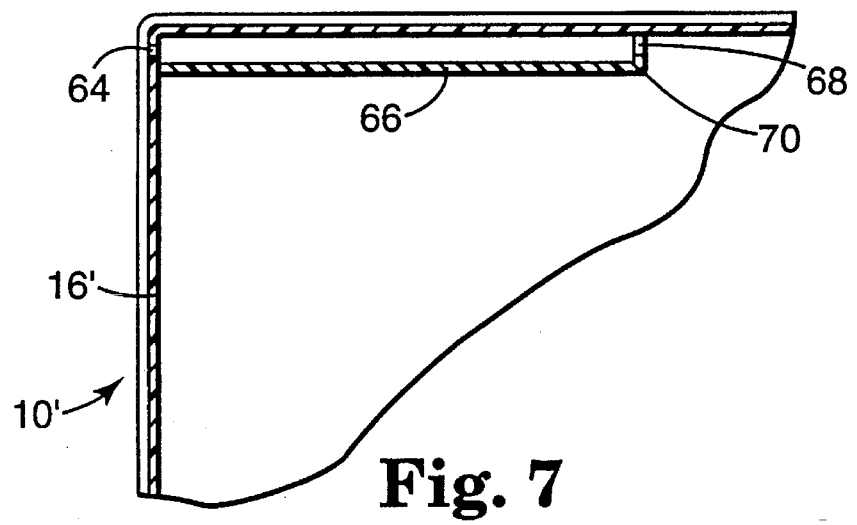
FIG. 7 is a partial side view of the cassette box having a hook housing area for the hook of FIGS. 4–6.

The hook 48 is inserted in a slot 64 in one side wall 16' of the box 10' and can be captured within a hook housing area 66, shown in FIG. 7. The slot 64 serves as an exterior slot of the hook housing area 66. The hook 48 passes through the slot 64 and an interior opening 68 in an inner wall 70 at the end opposite the slot 64. The first and second engaging walls 56, 60 engage respective sides of the inner wall 70 of the hook housing area 66 with the angled internal end 54 of the hook 48 permanently on the outer side of the inner wall 70 hook housing area 66. The first engaging walls 56 engage the outer side of the inner wall 70 and prevent inadvertent removal of the hook 48 from the hook housing area 66. These first engaging walls 56 also define the outer limits of the hook 48 in the extended position. The second engaging walls 60 engage the inner side of the inner wall 70 of the hook housing area 66 and define the limits of the hook 48 in the retracted position. The hook portion 52 can also define the limit of retraction of the hook 48 by engaging the respective side wall 16 of the box 10.

When the hook 48 is in the extended position, the first detents 58 help maintain the hook 48 in position by engaging the outer side of the inner wall 70 of the hook housing area 66. When the hook 48 is in the retracted position, the second detents 62 help maintain the hook 48 in position by engaging the inner side of the inner wall 70 of the hook housing area 66.

Figure 8:
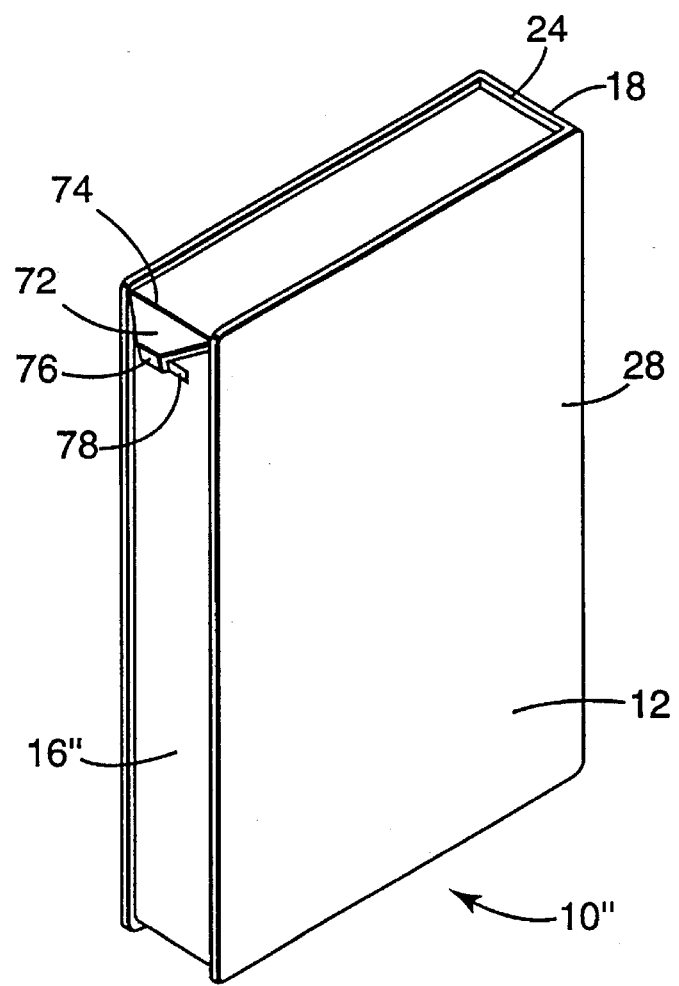
FIG. 8 is a side view of another embodiment of the cassette box having a living hinged hanging system hook.

In another hook embodiment shown in FIG. 8, the hook 72 can be molded to the box 10" using a living hinge 74. The end 76 of this hook 72 can be received in a hole 78 in the box side wall 16" to hold the hook 72 out of the way when it is not in use. The hook 72 can pivot from an extended position in which it can engage a bar to a folded-away position in which it is secured to the side wall 16" in the hole 78.

The box 10, 10', 10" can be made of opaque plastic, such as polypropylene or polyethylene, and can be, for example, injection molded polypropylene or blow molded polyethylene. The transparent external pocket 28 can be made of either polypropylene or polyethylene.

The box of this invention has substantially the same external dimensions as known boxes while including additional features. One additional feature is one or more internal pockets 80, shown in FIG. 1, for storing paper, diskettes, and other relatively thin items. In another embodiment, a face window can be located in the cover or the base with this window also covered by the external pocket 28. This window can be used to view any information on the face of a stored cassette. Also, this window can be used in combination with the external pocket 28 and an internal pocket 80 to serve as a storage location of a diskette (such as a 3.5 inch form factor computer diskette) without requiring a thicker box interior because the diskette can be stored in the space otherwise occupied by the box wall. The diskette is held in position by the external pocket 28, the internal pocket 80, and the walls which define the face window.

I claim:

1. A box for storing a cassette which has a spine and a door at least one of which can receive a label, wherein the box comprises:

a base;

a cover;

a plurality of side walls connected to at least one of the base and the cover and including a spine side wall, wherein the spine side wall has a window formed as an opening in the wall that permits access to the inside of the box and permits viewing a label on at least one of the spine and the door of the cassette when the cassette is oriented in the box with the label adjacent the spine side wall of the box; and a transparent external pocket which wraps around at least part of the spine side wall and at least part of at least one of the base and cover, wherein the transparent external pocket completely covers the window in the spine side wall, is the only physical barrier to prevent access to the inside of the box at the window, and permits viewing the label on the cassette.

2. The box of claim 1 wherein the transparent external pocket can receive a sheet of information that is readable through the transparent external pocket.

3. The box of claim 1 wherein the transparent external pocket permits viewing and reading the label on the cassette even when the label is spaced from the window by 10 mm.

4. The box of claim 1 further comprising means for aligning the spine of the cassette with the spine side wall of the box, wherein the aligning means prevents the box from being closed completely when the cassette spine does not align with the spine side wall.

5. The box of claim 1 further comprising means for hanging the box on a bar.

6. The box of claim 5 wherein the hanging means comprises a hook located on the opposite side of the box from the spine side wall.

7. The box of claim 6 wherein the hook is molded integrally as one piece with the box.

8. The box of claim 6 wherein the hook pivots from an extended position in which it can engage the bar to a folded-away position in which it is secured to the side wall of the box.

9. The box of claim 6 wherein the hook is slidable from an extended position in which it can engage the bar to a retracted position in which it is received within the box.

10. The box of claim 9 further comprising means for securing the hook in one of the extended and retracted positions.

11. The box of claim 10 wherein, during assembly of the box, the hook is inserted in a hook housing area in the box and is captured within the hook housing area such that it cannot be inadvertently removed from the hook housing area, while being slidable between the extended and retracted positions.

12. The box of claim 1 wherein at least one of the base and the cover has a face window formed as an opening that permits access to the inside of the box and permits viewing a label on a face of the cassette when the cassette is oriented in the box with the label adjacent facing the face window; and wherein the transparent external pocket completely covers the face window, is the only physical barrier to prevent access to the inside of the box at the face window, and permits viewing the label on the face of the cassette.

13. The box of claim 1 which is made of opaque plastic.

14. The box of claim 1 which is made of one of injection molded and blow molded plastic.

15. The box of claim 14 which is made of polypropylene.

16. The box of claim 1 wherein the transparent external pocket is made of polypropylene.

17. A box for storing a cassette which has a spine and a door at least one of which can receive a label, wherein the box comprises:

a base;

a cover;

a plurality of side walls connected to at least one of the base and the cover, wherein one of the base and the cover has a face window formed as an opening that permits access to the inside of the box and permits viewing a label on a face of the cassette when the cassette is oriented in the box with the label adjacent the face window;

a transparent external pocket which wraps around at least part of at least one of the base and cover, wherein the transparent external pocket completely covers the face window, is the only physical barrier to prevent access to the inside of the box at the face window, and permits viewing the label on the cassette.

18. The box of claim 17 further comprising an internal pocket formed on the inside of the box and located to at least partially cover the face window, wherein the face window is defined by walls, and wherein the face window is shaped to receive a computer diskette which is held in position by the external pocket, the internal pocket, and the walls of the face window.

* * * * *